United States Patent
Cherian et al.

(10) Patent No.: US 9,031,050 B2
(45) Date of Patent: May 12, 2015

(54) USING A MOBILE DEVICE TO ENABLE ANOTHER DEVICE TO CONNECT TO A WIRELESS NETWORK

(71) Applicant: Qualcomm Incorporated, San Diego, CA (US)

(72) Inventors: George Cherian, San Diego, CA (US); Jouni Malinen, San Diego, CA (US); Santosh Paul Abraham, San Diego, CA (US); Peerapol Tinnakornsrisuphap, San Diego, CA (US); Samir Kapoor, San Diego, CA (US); Rolf De Vegt, San Diego, CA (US)

(*) Notice: Subject to any disclaimer, the term of this patent is extended or adjusted under 35 U.S.C. 154(b) by 148 days.

(21) Appl. No.: 13/658,268

(22) Filed: Oct. 23, 2012

(65) Prior Publication Data

US 2013/0286889 A1 Oct. 31, 2013

Related U.S. Application Data

(60) Provisional application No. 61/625,627, filed on Apr. 17, 2012.

(51) Int. Cl.
```
H04W 4/00      (2009.01)
H04W 76/02     (2009.01)
H04L 29/06     (2006.01)
H04W 12/04     (2009.01)
```
(Continued)

(52) U.S. Cl.
CPC ............. *H04W 76/023* (2013.01); *H04L 63/18* (2013.01); *H04W 12/06* (2013.01); *H04W 84/12* (2013.01); *H04W 12/04* (2013.01)

(58) Field of Classification Search
USPC .......... 370/252–254, 328–339; 713/168–171; 726/2–5, 16–19
See application file for complete search history.

(56) References Cited

U.S. PATENT DOCUMENTS 5,673,317 A    9/1997   Cooper
5,964,877 A    10/1999  Victor et al.
(Continued)

FOREIGN PATENT DOCUMENTS

DE    102010010760 A1    9/2011
EP    1739880 A1    1/2007
(Continued)

OTHER PUBLICATIONS

3rd Generation Partnership Project; Technical Specification Group Services and System Aspects; Feasibility study on the security aspects, of remote provisioning and change of subscription for Machine to Machine (M2M) equipment (Release 9 ), 3GPP Standard; 3GPP TR 33.812, 3rd Generation Partnership Project (3GPP), Mobile Competence Centre ; 650, Route Des Lucioles.;. F-06921 Sophia-Antipolis Cedex- ; France, No. V9.2.0, Jun. 22, 2010, pp. 1-87, XP050441986, [retrieved-on Jun. 22, 2010].
(Continued)

*Primary Examiner* — Frank Duong
(74) *Attorney, Agent, or Firm* — S. Hossain Beladi

(57) ABSTRACT

A method includes, at a first device while the first device is connected to a wireless local area network (WLAN) and a second device is unconnected to the WLAN, establishing a secure channel to the second device using an EAP exchange. The method also includes sending at least one credential associated with the WLAN to the second device via the secure channel to enable the second device to connect to the WLAN.

38 Claims, 11 Drawing Sheets

(51) Int. Cl.
*H04W 12/06* (2009.01)
*H04W 84/12* (2009.01)

(56) References Cited

U.S. PATENT DOCUMENTS

| | | |
|---|---|---|
| 7,103,359 B1 | 9/2006 | Heinonen et al. |
| 7,616,594 B2 | 11/2009 | Roberts et al. |
| 7,715,796 B2 | 5/2010 | Honda et al. |
| 7,925,249 B2 | 4/2011 | Funk et al. |
| 8,036,639 B2 | 10/2011 | Carter et al. |
| 8,041,035 B2 | 10/2011 | Miller |
| 8,050,229 B2 | 11/2011 | Miao et al. |
| 8,073,428 B2 | 12/2011 | Khetawat et al. |
| 8,195,140 B2 | 6/2012 | Knezevic |
| 8,340,711 B1 | 12/2012 | Glass et al. |
| 8,381,268 B2 | 2/2013 | Winget et al. |
| 8,447,978 B2* | 5/2013 | Shiba .................. 713/169 |
| 8,457,797 B2 | 6/2013 | Imes et al. |
| 8,472,935 B1 | 6/2013 | Fujisaki |
| 8,670,755 B2 | 3/2014 | Knezevic |
| 8,688,077 B2 | 4/2014 | Fartmann et al. |
| 8,744,408 B2 | 6/2014 | Kimura et al. |
| 8,874,082 B2 | 10/2014 | Jha et al. |
| 2005/0054329 A1 | 3/2005 | Kokudo |
| 2005/0270989 A1 | 12/2005 | Park et al. |
| 2007/0079113 A1 | 4/2007 | Kulkarni et al. |
| 2007/0101136 A1 | 5/2007 | Lai et al. |
| 2009/0093232 A1 | 4/2009 | Gupta et al. |
| 2009/0205028 A1 | 8/2009 | Smeets et al. |
| 2010/0082988 A1 | 4/2010 | Huebner et al. |
| 2010/0304716 A1 | 12/2010 | Hoeksel et al. |
| 2011/0040862 A1 | 2/2011 | Nakajima |
| 2011/0072101 A1 | 3/2011 | Forssell et al. |
| 2011/0110521 A1 | 5/2011 | Yang et al. |
| 2011/0149930 A1 | 6/2011 | Sakai |
| 2011/0237224 A1 | 9/2011 | Coppinger |
| 2011/0238844 A1 | 9/2011 | Lu et al. |
| 2011/0271110 A1 | 11/2011 | Ohba et al. |
| 2011/0280227 A1 | 11/2011 | McCann et al. |
| 2012/0044865 A1 | 2/2012 | Singh et al. |
| 2012/0047551 A1 | 2/2012 | Pattar et al. |
| 2012/0100803 A1 | 4/2012 | Suumaki et al. |
| 2012/0106449 A1 | 5/2012 | Shibuya |
| 2013/0007858 A1* | 1/2013 | Shah et al. .................. 726/6 |
| 2013/0036231 A1* | 2/2013 | Suumaki .................. 709/228 |
| 2013/0081113 A1 | 3/2013 | Cherian et al. |
| 2013/0217359 A1 | 8/2013 | Cherian et al. |
| 2013/0242951 A1 | 9/2013 | Lee et al. |
| 2013/0308490 A1 | 11/2013 | Lim et al. |
| 2013/0309971 A1* | 11/2013 | Kiukkonen et al. ......... 455/41.2 |
| 2014/0023053 A1 | 1/2014 | Park et al. |
| 2014/0233425 A1 | 8/2014 | Cherian et al. |

FOREIGN PATENT DOCUMENTS

| | | |
|---|---|---|
| EP | 1748669 A1 | 1/2007 |
| JP | 2010219930 A | 9/2010 |
| JP | 2011510571 A | 3/2011 |
| WO | WO-2006128080 A2 | 11/2006 |

OTHER PUBLICATIONS

"Wi-Fi Protected Setup Specification Version 1.oh", Dec. 31, 2006, pp. 1-110, XP55031152, Internet Retrieved from the Internet: URL:http://gpl.back2roots.org/source/puma5 /netgear/CG3200-1TDNDS_GPL/ap/apps/wpa2/original/Wi-Fi Protected Setup Specification1. Oh.pdf [retrieved on Jun. 26, 2012].

International Search Report and Written Opinion—PCT/U S2013/036794—ISA/EPO—Jun. 24, 2013.

Ohba, Y., et al., "Extensible Authentication Protocol (EAP) Early Authentication Problem Statement; rfc5836.txt", Internet Engineering Task Force, IETF; Standard, Internet Society (ISOC) 4, Rue Des Falaises CH-1205 Geneva, Switzerland, Apr. 27, 2010, pp. 1-20, XP015070773.

* cited by examiner

USING A MOBILE DEVICE TO ENABLE ANOTHER DEVICE TO CONNECT TO A WIRELESS NETWORK

CROSS-REFERENCE TO RELATED APPLICATIONS

The present application claims priority from commonly owned U.S. Provisional Patent Application No. 61/625,627 filed Apr. 17, 2012, the contents of which are expressly incorporated herein by reference in their entirety.

FIELD

The present disclosure relates to wireless networks and wireless devices.

BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can execute software applications, such as a web browser application that can be used to access the Internet. As such, these wireless telephones can include significant computing capabilities.

A wireless device may connect to a wireless local area network (WLAN) through Wi-Fi Protected Setup (WPS). Typically, WPS is performed in personal identification number (PIN) mode or in push-button mode. In PIN mode, a user of the wireless device to be connected to an access point (AP) may enter a PIN into the wireless device (e.g., via a keypad) or into an access point (AP) (e.g., via a web portal) to facilitate the connection. In push-button mode, the user may push a physical button on the wireless device and a corresponding physical button on the AP to facilitate the connection. However, devices that do not have such push buttons or the ability to receive physical input of a PIN may not be able to join the wireless network.

SUMMARY

Some devices may not be able to receive physical input due to design or cost constraints. For example, certain devices may be "headless" devices that are controlled via a network interface and that do not include any input interfaces (e.g., buttons, keyboards, etc.) or output interfaces (e.g., displays). Furthermore, a user of the headless device may not know the credentials (e.g., service set identifier (SSID), passphrase, and/or security key) used to establish a WLAN connection. Systems and methods described herein may advantageously enable such headless wireless devices (as well as other wireless devices) to join a WLAN.

For example, a mobile device (e.g., a user's mobile phone) that is already connected to a home WLAN may enable a wireless device (e.g., a headless wireless device) to connect to the WLAN. Initially, the mobile device may create a secure channel with the wireless device. In particular implementations, the secure channel may be created using extensible authentication protocol (EAP), Wi-Fi protected access (WPA), or variants thereof. After the secure channel is created, the mobile device may supply WLAN credential(s) to the wireless device to enable the wireless device to connect to the WLAN. The mobile device may also supply additional information and credentials to the wireless device. For example, the mobile device may supply an application layer credential (e.g., account information for an Internet website) to the wireless device so that the wireless device may access an external network or other device using the application layer credential.

In a particular embodiment, a method includes, at a first device while the first device is connected to a WLAN and a second device is unconnected to the WLAN, establishing a secure channel to the second device using an EAP exchange. The method also includes sending, to the second device via the secure channel, at least one credential associated with the WLAN to enable the second device to connect to the WLAN. In an illustrative example, the first device may be a mobile phone and the second device may be a headless device.

In another particular embodiment, a method includes, at a first device (e.g., a headless device) while the first device is unconnected to a WLAN and a second device (e.g., a mobile phone) is connected to the WLAN, establishing a secure channel to the second device using an EAP exchange. The method also includes receiving, at the first device via the secure channel, at least one credential associated with the WLAN. The method further includes establishing, at the first device, a connection to the WLAN using the at least one credential.

In another particular embodiment, a method includes, at a first device, sending a first message to a second device during a WPS discovery operation. The method also includes, at the first device, sending a second message to the second device during a WPS authentication and configuration operation that follows the WPS discovery operation. The second message includes data associated with an EAP using a password (EAP-pwd) exchange.

In another particular embodiment, a method includes, at a first device while the first device is connected to a WLAN and a second device is unconnected to the WLAN, establishing a secure channel to the second device using a WPA2 Pre-shared Key (WPA2-PSK) exchange. The method also includes sending, to the second device via the secure channel, at least one credential associated with the WLAN to enable the second device to connect to the WLAN.

In another particular embodiment, an apparatus includes a processor and a memory coupled to the processor, where the memory stores instructions executable by the processor to establish, while the apparatus is connected to a wireless local area network (WLAN) and a second apparatus is unconnected to the WLAN, a secure channel to the second apparatus using an extensible authentication protocol (EAP) exchange. The memory also stores instructions executable by the processor to direct a transmitter to send, to the second apparatus via the secure channel, at least one credential associated with the WLAN to enable the second apparatus to connect to the WLAN.

In another particular embodiment, an apparatus includes a processor and a memory coupled to the processor, where the memory stores instructions executable by the processor to establish, while the apparatus is unconnected to a wireless local area network (WLAN) and a second apparatus is connected to the WLAN, a secure channel to the second device using an extensible authentication protocol (EAP) exchange.

The memory also stores instructions executable by the processor to receive, via the secure channel, at least one credential associated with the WLAN. The processor is further configured to establish a connection to the WLAN using the at least one credential.

In another particular embodiment, an apparatus includes a processor and a memory coupled to the processor, where the memory stores instructions executable by the processor to direct a transmitter to send a first message to a second apparatus during a Wi-Fi Protected Setup (WPS) discovery operation. The memory also stores instructions executable by the processor to direct the transmitter to send a second message to the second apparatus during a WPS authentication and configuration operation that follows the WPS discovery operation. The second message includes data associated with an extensible authentication protocol (EAP) using a password (EAP-pwd) exchange.

In another particular embodiment, an apparatus includes a processor and a memory coupled to the processor, where the memory stores instructions executable by the processor to establish, while the apparatus is connected to a wireless local area network (WLAN) and a second apparatus is unconnected to the WLAN, a secure channel to a second apparatus using a Wi-Fi Protected Access 2 Pre-shared Key (WPA2-PSK) exchange. The memory also stores instructions executable by the processor to direct a transmitter to send at least one credential associated with the WLAN to the second apparatus via the secure channel to enable the second device to connect to the WLAN.

One particular advantage provided by at least one of the disclosed embodiments is an ability of a first device (e.g., a mobile device) to enable a second device (e.g., a headless device) to connect to a wireless network.

Other aspects, advantages, and features of the present disclosure will become apparent after review of the entire application, including the following sections: Brief Description of the Drawings, Detailed Description, and the Claims.

DETAILED DESCRIPTION

Figure 1:
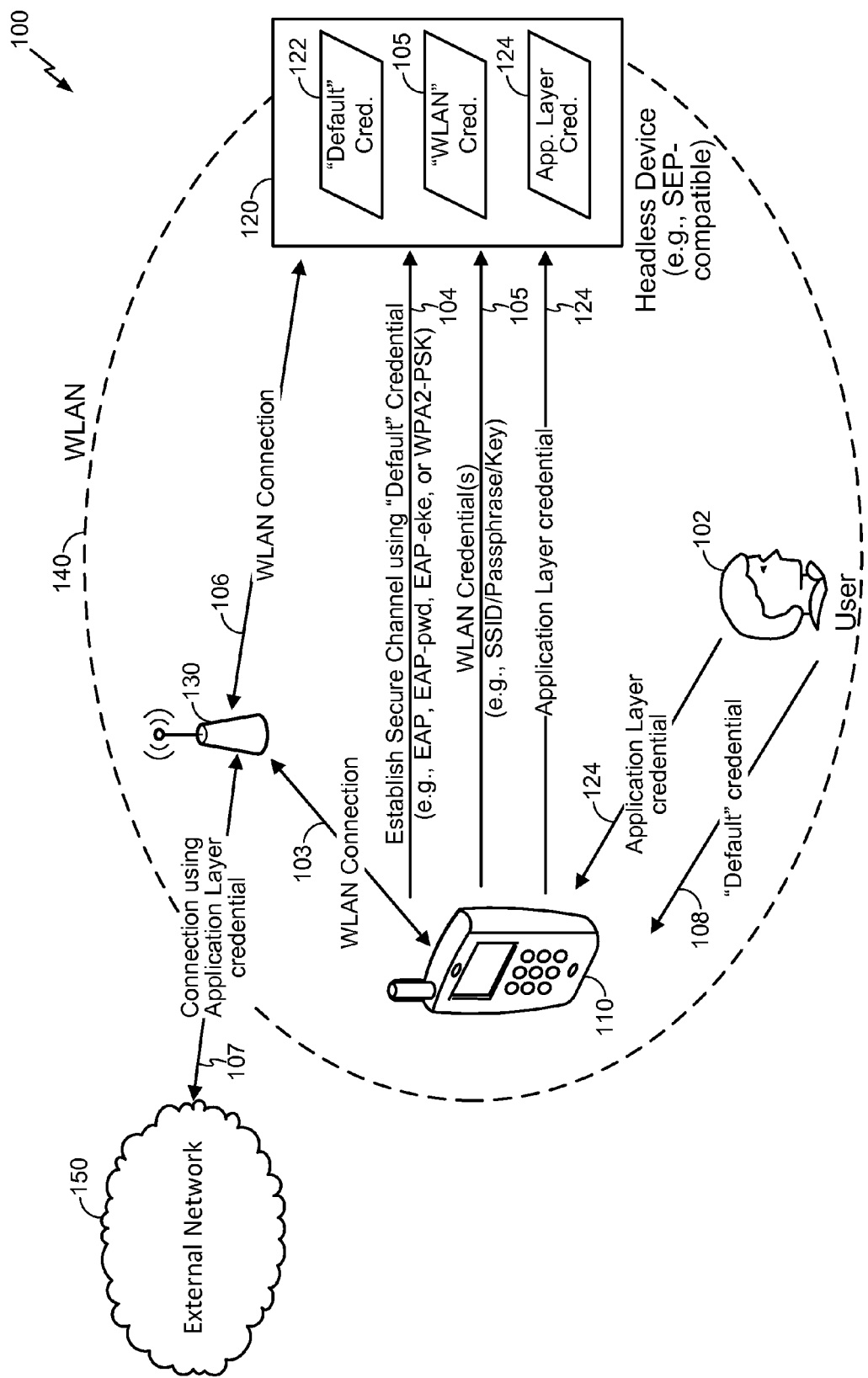
FIG. 1 is a diagram to illustrate a particular embodiment of a system operable to enable a device to access a WLAN.

FIG. 1 is a diagram to illustrate a particular embodiment of a system 100 operable to enable a device (e.g., illustrative headless device 120) to access a WLAN 140. The system 100 also includes a mobile device 110 and an access point (AP) 130. In a particular embodiment, the WLAN 140 may be a customer premise (e.g., home or office) wireless network that selectively communicates with an external network 150 via the AP 130. For example, the external network 150 may be the Internet and/or may include Internet-accessible computing devices, such as servers.

The mobile device 110 may be a mobile telephone, a portable computing device, a tablet computing device, a personal digital assistant (PDA), a portable media player, or any combination thereof. The mobile device 110 may be connected to the AP 130 through a WLAN connection 103 using one or more WLAN credentials 105. The WLAN credential(s) 105 may be supplied by a user 102 or by the AP 130 (e.g., during a previously completed Wi-Fi protected setup (WPS) operation). The mobile device 110 may host an internal registrar for the purpose of WPS setup and may be compatible with Wi-Fi Direct, which may enable the mobile device 110 to communicate with other Wi-Fi devices without use of the AP 130. The mobile device 110 may store the WLAN credential(s) 105 in a memory of the mobile device 110. In a particular embodiment, the WLAN credential(s) 105 include a service set identifier (SSID), a passphrase, a security key, or any combination thereof.

The headless device 120 may be a device that includes a network interface (e.g., wireless network interface) but does not include an input device (buttons, keyboards, etc.) or output interfaces (e.g., displays). Thus, the headless device 120 may be configurable only via communication with another device and not directly via physical input. The headless device 120 may also be compatible with Wi-Fi Direct. In a particular embodiment, the headless device 120 is a smart energy profile (SEP)-compatible device, such as a SEP 2.0-compatible device. Examples devices that may be SEP 2.0-compatible include, but are not limited to, home appliances (e.g., washer, dryer, refrigerator, etc.) and sensors (e.g., smoke detectors).

During operation, the user 102 may introduce the headless device 120 into a networked environment. For example, the user 102 may purchase the headless device 120 (e.g., a blood pressure monitor) and bring the headless device 120 home. The user 102 may use the mobile device 110 (e.g., the user's smart phone) to program the headless device 120 to enable the headless device 120 to connect to the WLAN 140. In a particular embodiment, the user 102 may download and/or install an application to the mobile device 110 to configure the headless device 120.

The mobile device 110 may discover the headless device 120 through a Wi-Fi Direct connection during a WPS discovery operation. In a particular embodiment, the mobile device 110 appears to the headless device 120 as an autonomous Wi-Fi Direct group owner, and the headless device 120 acts as a Wi-Fi Direct client. The mobile device 110 may broadcast a default service set identification (SSID) (e.g., supplied by a manufacturer of the headless device 120), a device identifier associated with the headless device 120 (e.g., supplied by the manufacturer of the headless device 120), or a combination thereof to enable the mobile device 110 to connect to the headless device 120. The headless device 120 may be programmed to search for and connect to a network identified by the default SSID upon powering up. Once the headless device 120 and the mobile device 110 are connected via Wi-Fi Direct, the user 102 may enter a default security credential 108 (e.g., a username, a password, a passphrase, a PIN, or any combination thereof) associated with the headless device 120 into the mobile device 110 in order for the mobile device 110 to access the headless device 120.

The default security credential 108 may be obtained from packaging or an instruction manual of the headless device 120 or from the headless device 120 itself (e.g., from a sticker on the headless device 120). Alternatively, the user 102 may download and execute an application from a manufacturer's website via a unique uniform resource locator (URL) that is specific to the headless device 120, where the application includes the default security credential 108. For example, the unique URL may be included in the packaging, the instruction manual, or the sticker on the headless device 120. In alternate embodiments, the mobile device 110 may scan or otherwise capture graphical information (e.g., a bar code) associated with the headless device 120 to determine the default security credential 108. In a particular embodiment, the default security credential 108 is a layer-2 (e.g., Open Systems Interconnect (OSI) link layer) credential and/or enables operations at the headless device 120 that are layer-2 or lower.

The mobile device 110 may transmit the default security credential 108 to the headless device 120 to establish a secure channel 104 using an EAP exchange (e.g., an EAP 802.1X exchange, an EAP-pwd exchange, or an EAP with an encrypted key exchange (EAP-eke)), a WPA2-PSK exchange, or any combination thereof. The headless device 120 may determine whether the default security credential 108 matches a stored default security credential 122 (e.g., stored in a memory of the headless device 120). If the default security credential 108 does not match the stored default security credential 122, the headless device 120 may terminate the EAP exchange. If the default security credential 108 matches the stored default security credential 122, the EAP exchange may be completed and the secure channel 104 may be established. The mobile device 110 may transmit the WLAN credential(s) 105 to the headless device 120 through the secure channel 104. The headless device 120 may then use the WLAN credential(s) 105 to connect to the WLAN 140 through the AP 130, thereby establishing a WLAN connection 106.

Additionally, the user 102 may supply an application layer credential 124 to the headless device 120 via the mobile device 110, where the application layer credential 124 enables the headless device 120 to establish a connection 107 to the external network 150. For example, the user 102 may enter login information associated with an account of the user 102 at a hospital's website into the mobile device 110, and the mobile device 110 may send such login information to the headless device 120, such as the blood pressure monitor, so that the blood pressure monitor may upload blood pressure readings to the hospital website.

In a particular embodiment, the application layer credential 124 is a layer-7 (e.g., Open Systems Interconnect (OSI) application layer) credential and/or enables operations at the headless device 120 that are layer-7 or lower. The headless device 120 (e.g., the blood pressure monitor) may store the application layer credential 124 in a memory of the headless device 120. In a particular alternative embodiment, the headless device 120 may replace at least a portion of the stored default security credential 122 with the application layer credential 124, so that the application layer credential 124 may subsequently be used for both layer-2 operations (e.g., setting up a connection with the WLAN 140) as well as layer-7 operations (e.g., transferring data to the external network 150), and so that the user 102 only needs to remember one set of credentials associated with the headless device 120.

Although the mobile device 110 may be configured to send a "notice of absence" message to notify other devices of a planned power-down period, while the mobile device 110 is connected to the headless device 120 or other such devices through Wi-Fi Direct, the mobile device 110 refrains from issuing such "notice of absence" messages. By refraining from issuing "notice of absence" messages, the mobile device 110 maintains compatibility with legacy Wi-Fi Direct clients that are not equipped to interpret the "notice of absence" messages.

The system 100 may thus enable a device (e.g., the mobile device 110) to assist another device (e.g., the headless device 120) to access a WLAN (e.g., the WLAN 140). The system 100 may also enable management of layer-2 and layer-7 operations using a single set of security credentials, resulting in a simpler device management scheme. It should be noted that the headless device 120 is for illustration only. The mobile device 110 may also enable other types of wireless devices to connect to the WLAN 140. For example, the mobile device 110 (e.g., a mobile phone) may enable a non-headless device (e.g., a tablet computer, a game console, or another mobile phone) to connect to the WLAN 140.

Figure 2:
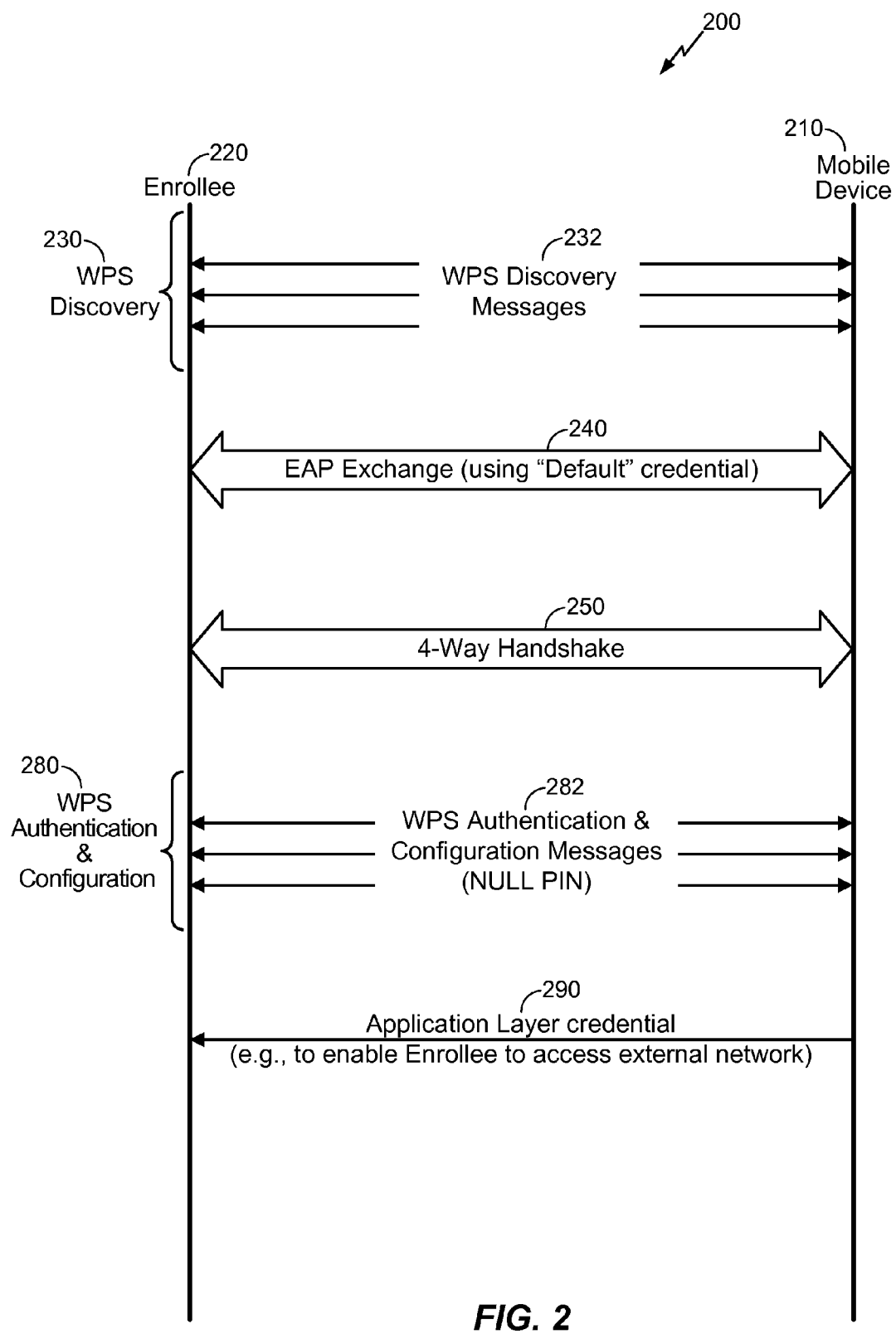
FIG. 2 is a ladder diagram to illustrate a particular embodiment of messaging associated with enabling a device to access a WLAN using an EAP exchange.

FIG. 2 is a ladder diagram to illustrate a particular embodiment of messaging associated with a mobile device 210 enabling an enrollee 220 to access a WLAN using an EAP exchange and is generally designated 200. In an illustrative embodiment, the mobile device 210 may be the mobile device 110 of FIG. 1 and the enrollee 220 may be the headless device 120 of FIG. 1.

During operation, the mobile device 210 and the enrollee 220 may first engage in a WPS discovery operation 230. During the WPS discovery operation 230, the mobile device 210 and the enrollee 220 may exchange various WPS discovery messages 232. Based on the WPS discovery messages 232, the mobile device 210 may determine that the enrollee 220 is WPS-capable. Details of the WPS discovery operation 230 are further described with reference to FIG. 5.

After the WPS discovery operation 230, the mobile device 210 may establish a secure channel with the enrollee 220 through an EAP exchange 240 using a default credential (e.g., the default security credential 108 of FIG. 1). In a particular embodiment, the EAP exchange 240 is an EAP 802.1X exchange. The mobile device 210 and the enrollee 220 may also perform a 4-way handshake 250, during which one or more cryptographic keys may be generated and exchanged between the mobile device 210 and the enrollee 220. In a particular embodiment, the 4-way handshake 250 is a WPA2 4-Way handshake. The mobile device 210 and the enrollee 220 may engage in a WPS authentication and configuration operation 280. During the WPS authentication and configuration operation 280, the mobile device 210 and the enrollee 220 may exchange one or more WPS authentication and configuration messages 282 using a null PIN (e.g., a public PIN). One or more WLAN credentials (e.g., the WLAN credential(s) 105 of FIG. 1) may be transmitted from the mobile device 210 to the enrollee 220 to enable the enrollee to access a WLAN. In addition, the mobile device 210 may supply an application layer credential 290 (e.g., the application layer credential 124 of FIG. 1) to the enrollee 220 to enable the enrollee 220 to access an external network (e.g., the external network 150 of FIG. 1).

Figure 3:
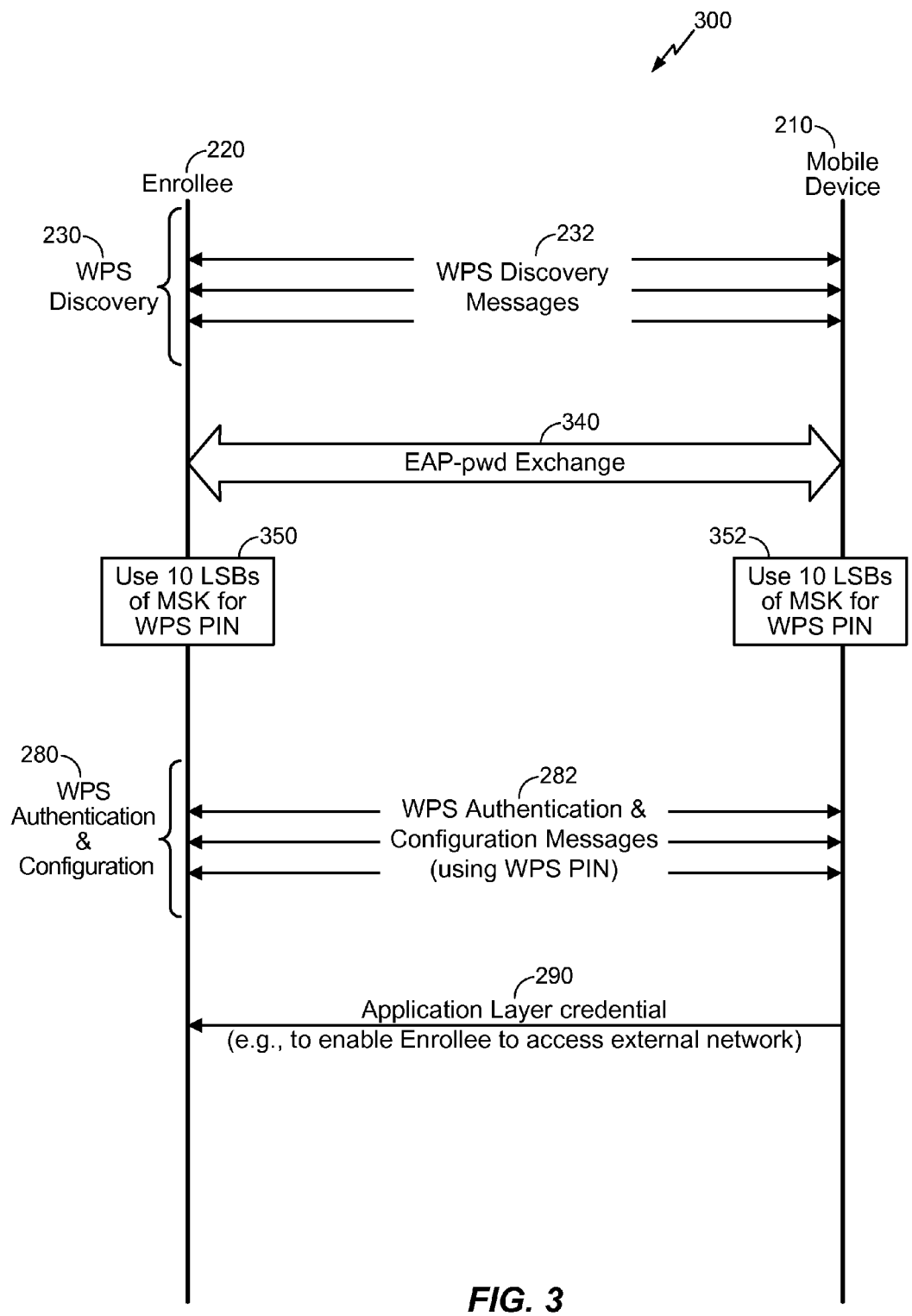
FIG. 3 is a ladder diagram to illustrate a particular embodiment of messaging associated with enabling a device to access a WLAN using an EAP-pwd exchange generated PIN.

It should be noted that the EAP 802.1X exchange 240 and the 4-way handshake 250 are provided as just one example of establishing a secure channel. The mobile device 210 may establish a secure channel with the enrollee 220 through various other techniques. For example, FIG. 3 is a ladder diagram to illustrate a particular embodiment 300 of messaging associated with the mobile device 210 enabling the enrollee 220 to access a WLAN using a PIN that is generated based on an EAP-pwd exchange 340 and is generally designated 300.

In a particular embodiment, a master session key (MSK) is generated during the EAP-pwd exchange 340. The mobile device 210 and the enrollee 220 may each use a portion of the MSK to generate a WPS PIN, as shown at 350 and 352. The WPS PIN may be used during the WPS authentication and configuration operation 280 instead of the NULL PIN of FIG. 2. In a particular embodiment, the ten least significant bytes of the MSK are used as the WPS PIN.

Figure 4:
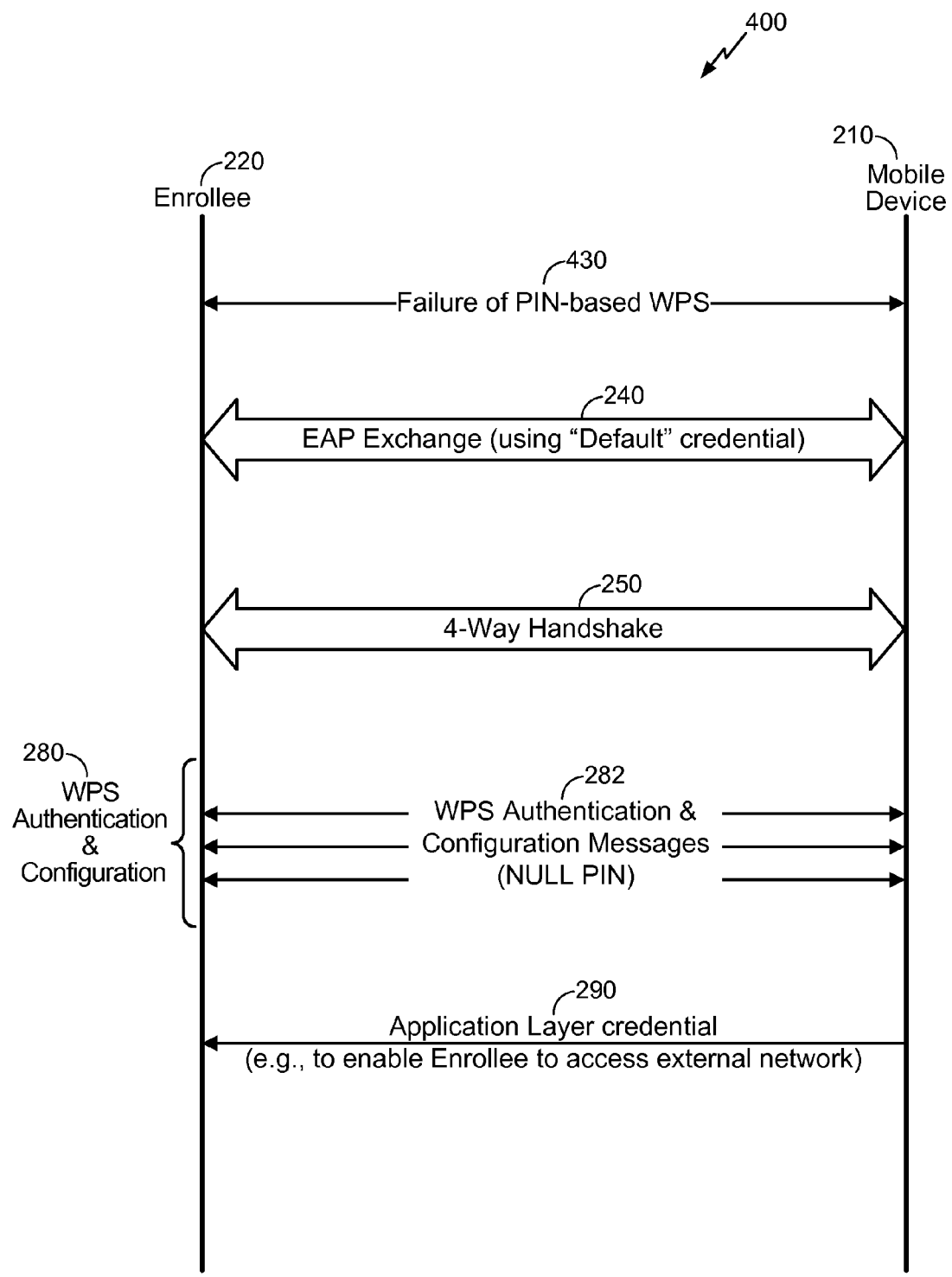
FIG. 4 is a ladder diagram to illustrate a particular embodiment of messaging associated with enabling a device to access a WLAN using an EAP exchange following a PIN-based WPS failure.

FIG. 4 is a ladder diagram to illustrate a particular embodiment of messaging associated with the mobile device 210 enabling the enrollee 220 to access a WLAN using the EAP exchange of FIG. 2 following a failure 430 of a PIN-based WPS operation and is generally designated 400.

For example, instead of or in addition to the WPS discovery operation 230 of FIG. 2, the mobile device 210 and the enrollee 220 may attempt to complete PIN-based WPS. However, the PIN-based WPS may fail (e.g., due to an incorrect PIN or no PIN being provided). This failure 430 may trigger the mobile device 210 to establish a secure channel with the enrollee 220 using the EAP exchange 240 and 4-way handshake 250 of FIG. 2.

Figure 5:
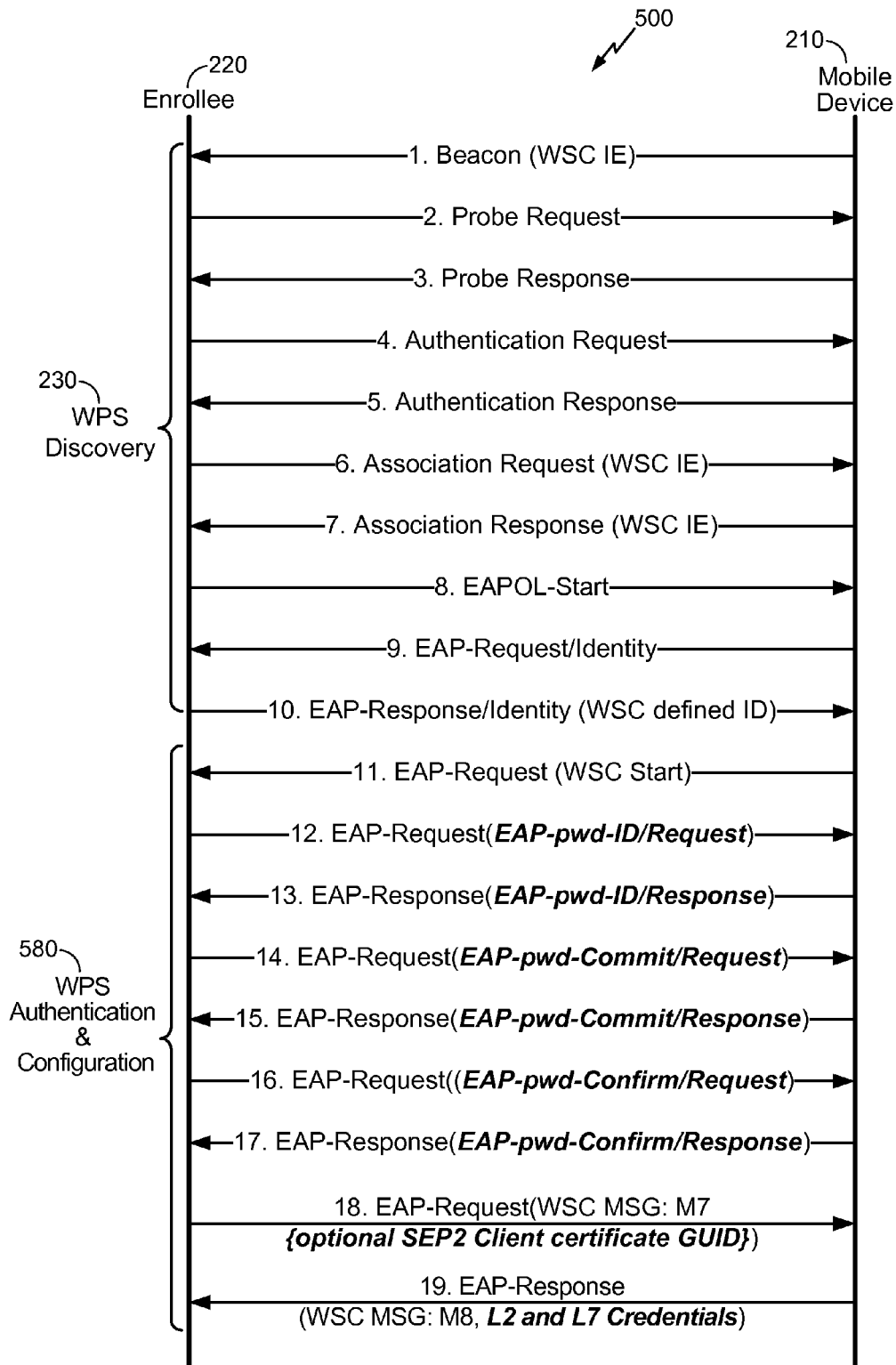
FIG. 5 is a ladder diagram to illustrate a particular embodiment of messaging associated with enabling a device to access a WLAN using an EAP-pwd exchange.

FIG. 5 is a ladder diagram to illustrate a particular embodiment of messaging associated with the mobile device 210 enabling the enrollee 220 to access a WLAN using an EAP-pwd exchange and is generally designated 500.

The mobile device 210 and the enrollee 220 may perform the WPS discovery operation 230. During the WPS discovery operation 230, the mobile device 210 may exchange multiple messages (e.g., messages designated 1-10 in FIG. 5) with the enrollee 220. For example, the mobile device 210 may transmit a beacon message M1 to the enrollee 220. In response, the enrollee 220 may transmit a probe request message M2 to the mobile device 210, triggering a probe response message M3 from the mobile device 210 to the enrollee 220. The enrollee 220 may proceed to transmit an authentication request message M4 to the mobile device 210, triggering an authentication response message M5 from the enrollee 220. An association request message M6, an association response message M7, an EAP over Local Area Network start (EAPOL-Start) message M8, an EAP-Request/Identity message M9, and an EAP-Response/Identity message M10 may also be exchanged, as shown.

Following the WPS discovery operation 230, the mobile device 210 and the enrollee 220 may engage in a WPS authentication and configuration operation 580 using an EAP-pwd exchange. For example, the mobile device 210 may transmit an EAP-Request message M11 to the enrollee 220 to signal a start of the WPS authentication and configuration operation 580. The enrollee 220 may transmit an EAP-pwd-ID/Request message M12 to the mobile device 210, and the mobile device 210 may respond with an EAP-pwd-ID/Response message M13. The mobile device 210 and the enrollee 220 may compute a MSK after exchanging an EAP-pwd-Commit/Request message M14, an EAP-pwd-Commit/Response message M15, an EAP-pwd-Confirm/Request message M16, and an EAP-pwd-Confirm/Response message M17. In a particular embodiment, a SEP 2.0 client certificate globally unique identifier (GUID) is sent from the enrollee 220 to the mobile device via an EAP-Request message M18. The mobile device 210 may transmit a link layer (L2) credential (e.g., the WLAN credential(s) 105 of FIG. 1) and/or an application layer (L7) credential (e.g., the application layer credential 124 of FIG. 1) to the enrollee 220 via an EAP-Response message M19.

Figure 6:
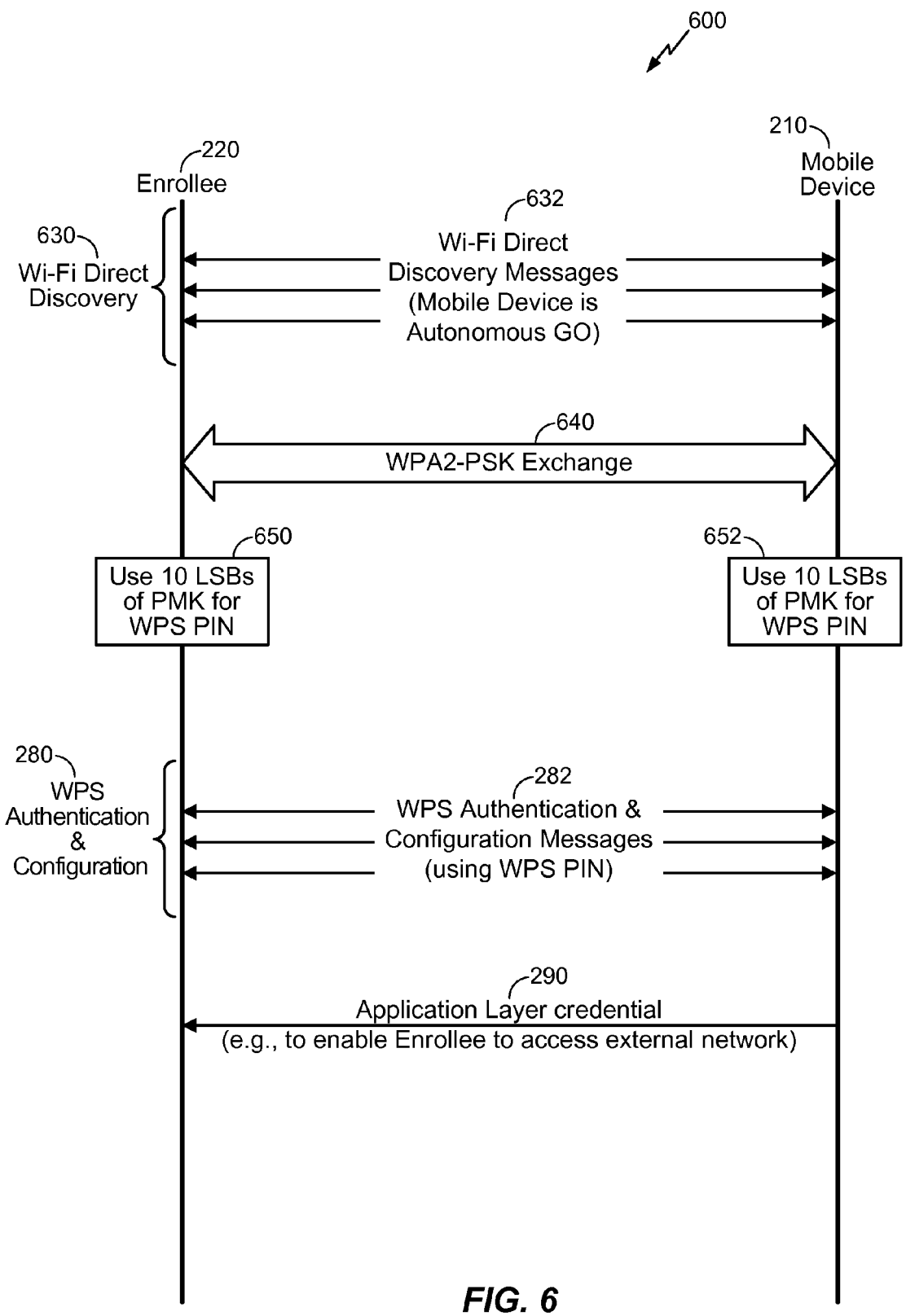
FIG. 6 is a ladder diagram to illustrate a particular embodiment of messaging associated with enabling a device to access a WLAN using a WPA2-PSK exchange generated PIN.

FIG. 6 is a ladder diagram to illustrate a particular embodiment of messaging associated with the mobile device 210 enabling the enrollee 220 to access a WLAN using a PIN that is generated during a WPA2-PSK exchange 640.

Instead of the WPS discovery operation 230 of FIG. 2, the mobile device 210 and the enrollee 220 may perform a Wi-Fi Direct discovery operation 630, which may involve exchanging various Wi-Fi Direct discovery messages 632. In a particular embodiment, the mobile device 210 acts as an autonomous Wi-Fi Direct group owner (GO) with respect to the enrollee 220. The mobile device 210 may establish a secure channel with the enrollee 220 using the WPA2-PSK exchange 640. A pairwise master key (PMK) may be generated during the WPA2-PSK exchange 640, and the mobile device 210 and the enrollee 220 may use a portion (e.g., ten least significant bytes) of the PMK as the WPS PIN, as shown at 650 and 652. The mobile device 210 and the enrollee 220 may engage in a WPS authentication and configuration operation 280 using the WPS PIN.

FIGS. 2-6 thus illustrate various examples of setting up a secure channel between the mobile device 210 and the enrollee 220 (e.g., a headless device). The secure channel may be used by the mobile device 210 to provide WLAN credential(s) and application layer credential(s) to the enrollee 220, enabling the enrollee 220 to connect to a WLAN and an external network, respectively.

Figure 7:
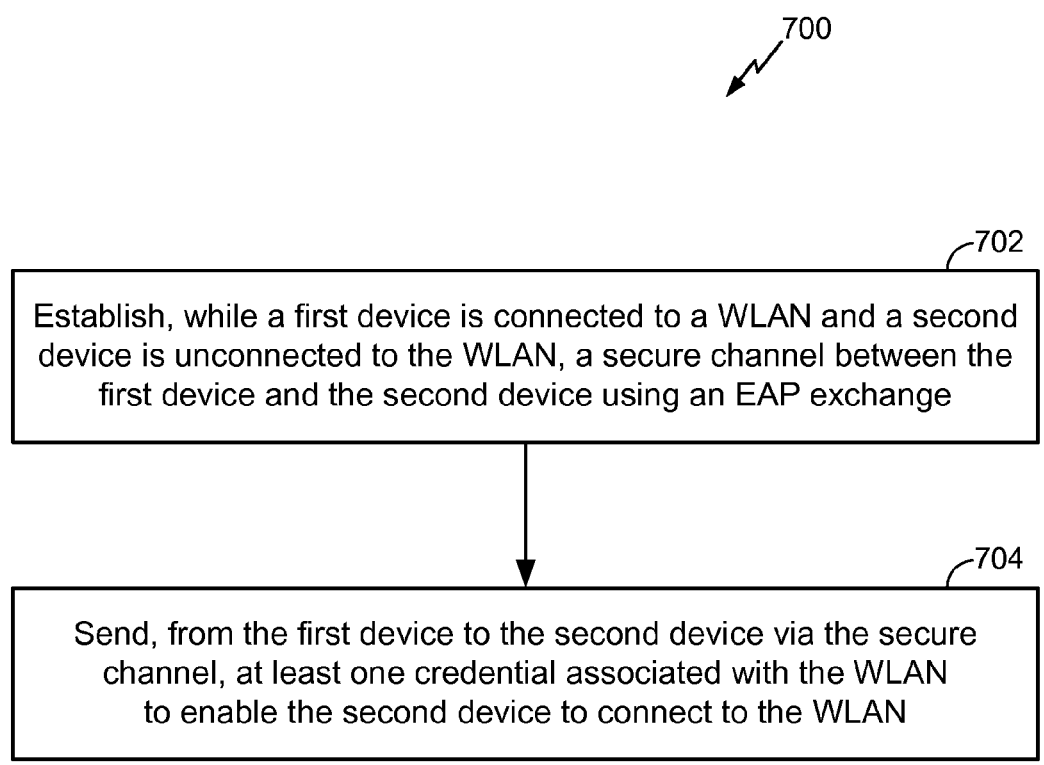
FIG. 7 is a flowchart to illustrate a particular embodiment of a method of operation at the mobile device of FIG. 1 in accordance with the messaging of FIGS. 2-4.

FIG. 7 is a flowchart to illustrate a particular embodiment of a method 700 of operation at the mobile device 110 of FIG. 1 in accordance with the messaging of FIGS. 2-4.

The method 700 may include establishing, while a first device (e.g., a mobile phone) is connected to a wireless local area network (WLAN) and a second device (e.g., a headless device) is unconnected to the WLAN, a secure channel between the first device and the second device using an extensible authentication protocol (EAP) exchange, at 702. For example, in FIG. 1, the mobile device 110 may establish the secure channel 104 with the headless device 120 using the default security credential 108 while the mobile device 110 is connected to the WLAN 140 and the headless device 120 is unconnected to the WLAN 140.

The method 700 may also include sending, from the first device to the second device via the secure channel, at least one credential associated with the WLAN to enable the second device to connect to the WLAN, at 704. For example, in FIG. 1, the mobile device 110 may send the WLAN credential(s) 105 to the headless device 120 to enable the headless device 120 to connect to the WLAN 140. The headless device 120 may then use the WLAN credential(s) 105 to establish the WLAN connection 106.

Figure 8:
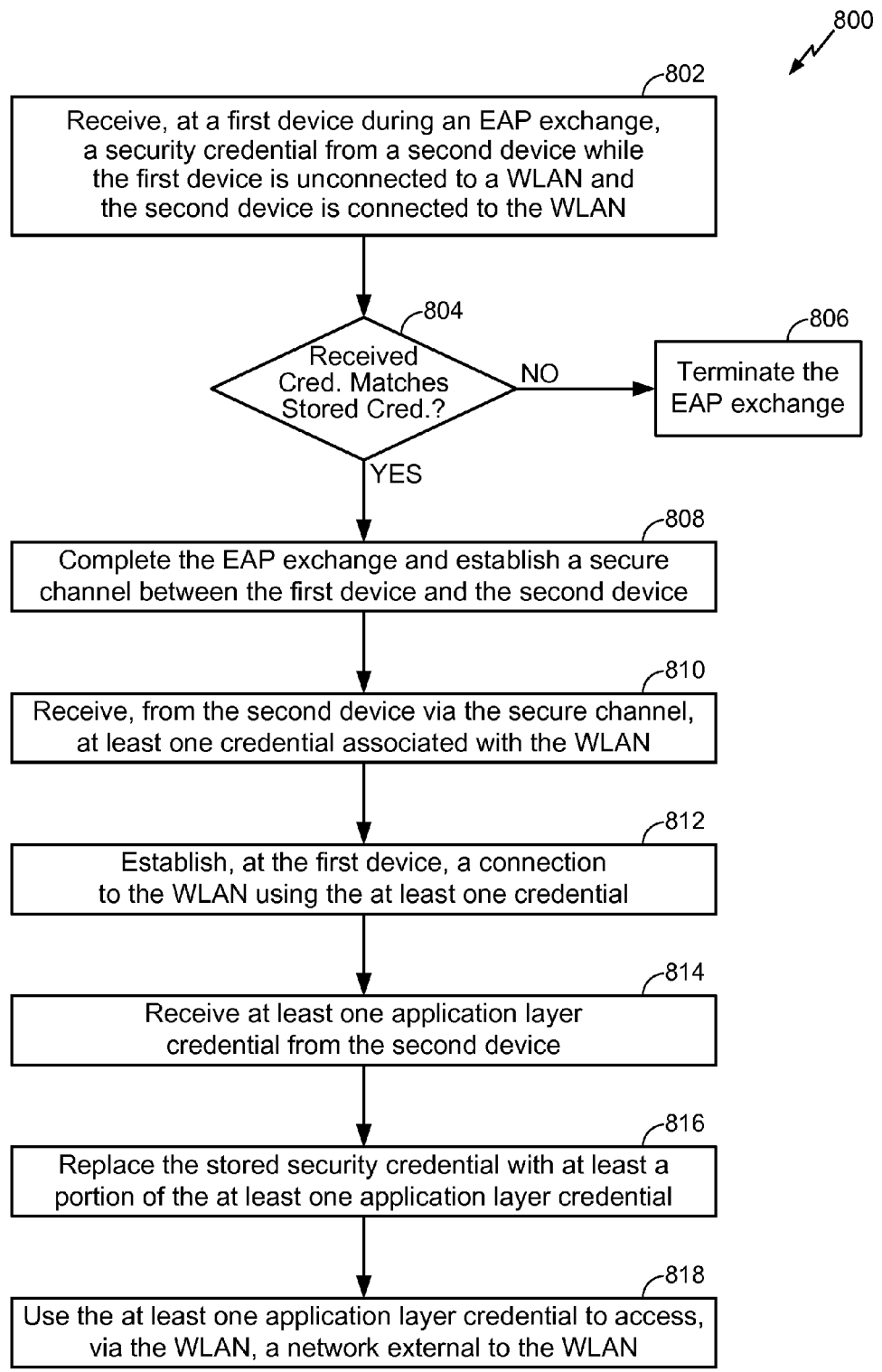
FIG. 8 is a flowchart to illustrate a particular embodiment of a method of operation at the headless device of FIG. 1 in accordance with the messaging of FIGS. 2-4.

FIG. 8 is a flowchart to illustrate a particular embodiment of a method 800 of operation at the headless device 120 of FIG. 1 in accordance with the messaging of FIGS. 2-4.

The method 800 may include receiving, at a first device during an EAP exchange, a security credential from a second device while the first device is unconnected to a WLAN and the second device is connected to the WLAN, at 802. For example, in FIG. 1, the headless device 120 may receive the default security credential 108 from the mobile device 110 through the secure channel 104 while the headless device 120 is unconnected to the WLAN 140 and the mobile device 110 is connected to the WLAN 140.

The method 800 may also include determining whether the received credential matches a stored credential, at 804. For example, in FIG. 1, the headless device 120 may determine whether the default security credential 108 matches the stored default security credential 122. When the received credential does not match the stored credential, the method 800 may include terminating the EAP exchange, at 806. When the received credential matches the stored credential, the method 800 may include completing the EAP exchange and establishing a secure channel between the first device and the second device, at 808. For example, in FIG. 1, the EAP exchange may be completed and the secure channel 104 may be established.

The method 800 may further include receiving, from the second device via the secure channel, at least one credential associated with the WLAN, at 810. For example, in FIG. 1, the headless device 120 may receive the WLAN credential(s) 105 from the mobile device 110 through the secure channel 104. The method 800 may include establishing, at the first device, a connection to the WLAN using the at least one credential, at 812. For example, in FIG. 1, the headless device 120 may use the WLAN credential(s) 105 to establish the WLAN connection 106 to the WLAN 140.

The method 800 may also include receiving at least one application layer credential from the second device, at 814. For example, in FIG. 1, the headless device 120 may receive the application layer credential 124 from the mobile device 110. The method 800 may further include replacing the stored security credential with at least a portion of the at least one application layer credential, at 816. For example, in FIG. 1, the headless device 120 may replace at least a portion of the stored default security credential 122 with the application layer credential 124. In an alternate embodiment, the application layer credential is stored in addition to the default credential.

The method 800 may include using the at least one application layer credential to access, via the WLAN, a network external to the WLAN, at 818. For example, in FIG. 1, the headless device 120 may use the application layer credential 124 to access the external network 150.

Figure 9:
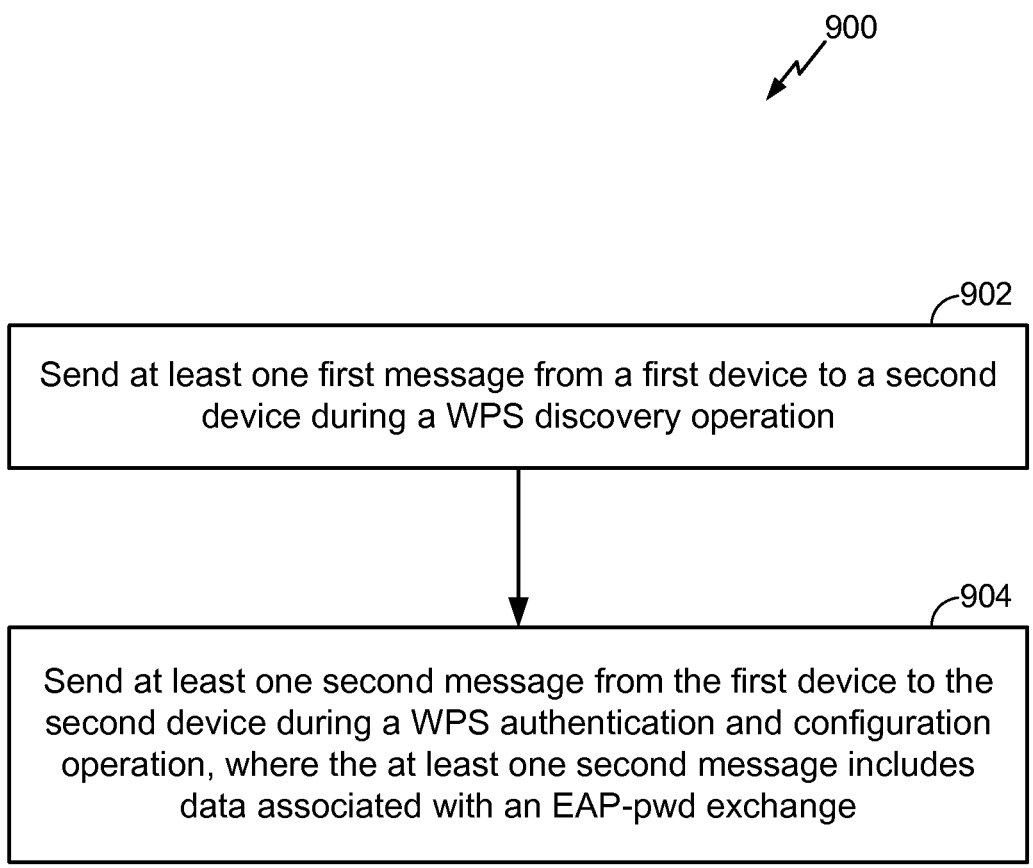
FIG. 9 is a flowchart to illustrate a particular embodiment of a method of operation at the system of FIG. 1 in accordance with the messaging of FIG. 5.

FIG. 9 is a flowchart to illustrate a particular embodiment of a method 900 of operation at the system 100 of FIG. 1 in accordance with the messaging of FIG. 5.

The method 900 includes sending at least one first message from a first device to a second device during a WPS discovery operation, at 902. For example, referring to FIG. 5, the mobile device 210 may exchange the messages M1-M10 with the enrollee 220 during the WPS discovery operation 230.

The method 900 may also include sending at least one second message from the first device to the second device during a WPS authentication and configuration operation, at 904. The at least one second message may include data associated with an EAP-pwd exchange. For example, referring to FIG. 5, the mobile device 210 and the enrollee 220 may perform the WPS authentication and configuration operation 580 using the EAP-pwd exchange corresponding to messages M11-M19.

Figure 10:
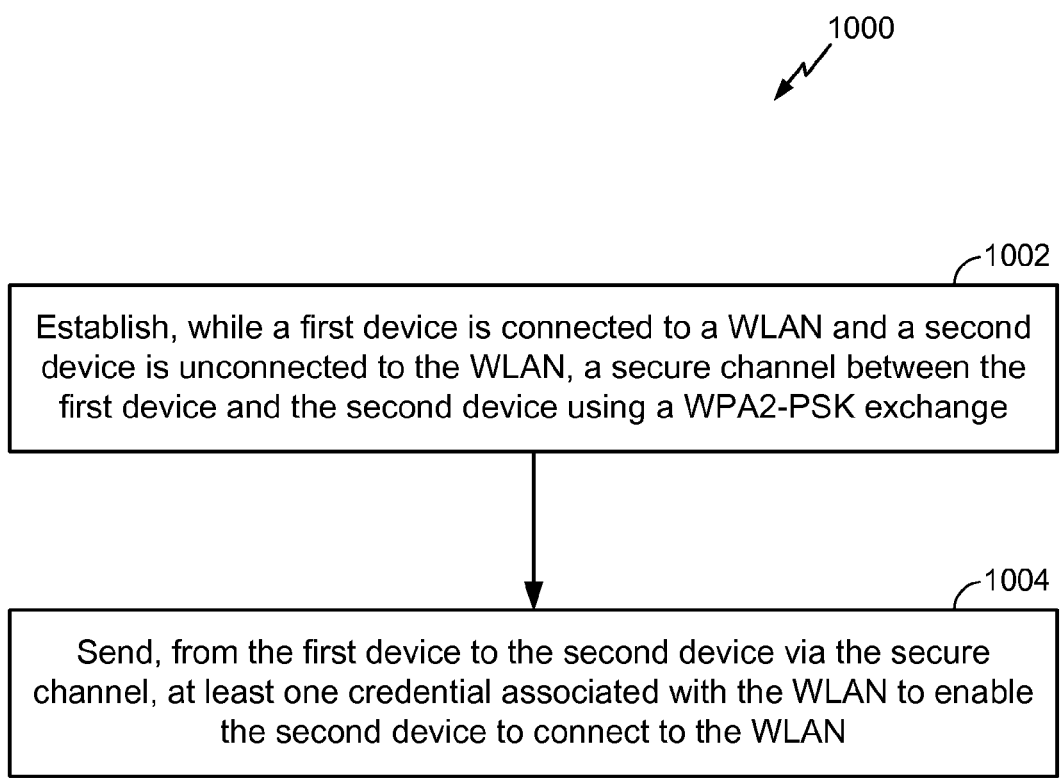
FIG. 10 is a flowchart to illustrate a particular embodiment of a method of operation at the system of FIG. 1 in accordance with the messaging of FIG. 6.

FIG. 10 is a flowchart to illustrate a particular embodiment of a method 1000 of operation at the system 100 of FIG. 1 in accordance with the messaging of FIG. 6.

The method 1000 includes establishing, while a first device is connected to a WLAN and a second device is unconnected to the WLAN, a secure channel between the first device and the second device using a WPA2-PSK exchange, at 1002. For example, referring to FIG. 6, the mobile device 210 may establish a secure channel with the enrollee 220 using the WPA2-PSK exchange 640. The method 1000 may also include sending, from the first device to the second device via the secure channel, at least one credential associated with the WLAN to enable the second device to connect to the WLAN, at 1004. In a particular embodiment, the at least one WLAN credential may be the WLAN credential(s) 105 of FIG. 1. The headless device 120 may then use the WLAN credential(s) 105 to establish the WLAN connection 106.

Figure 11:
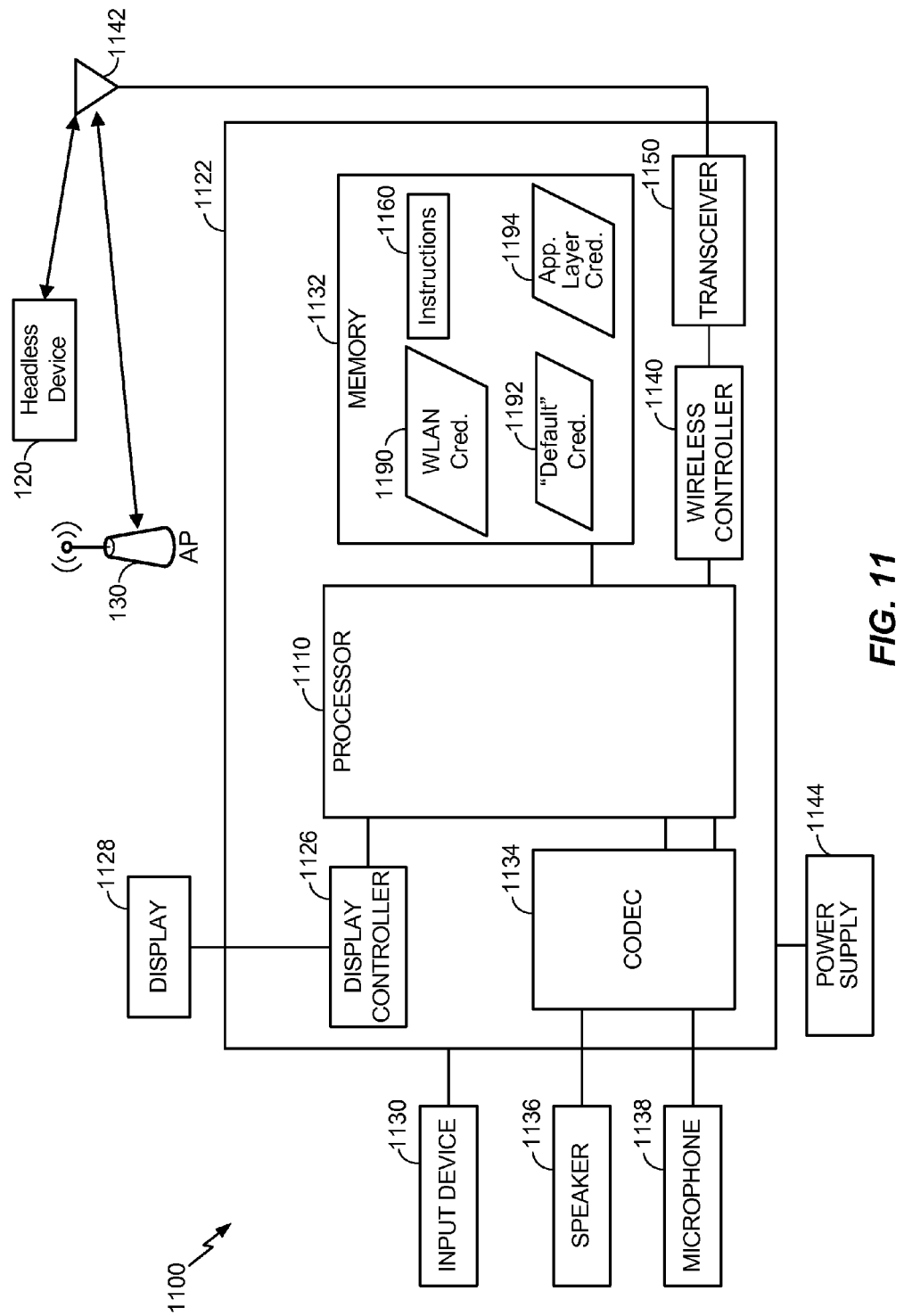
FIG. 11 is a block diagram of a communication device including components that are operable to enable another device to access a WLAN.

FIG. 11 is a block diagram of a communication device 1100. In one embodiment, the communication device 1100, or components thereof, include or are included within the mobile device 110 in FIG. 1, the mobile device 210 of FIGS. 2-6, or any combination thereof. Further, all or part of the methods described in FIGS. 7 and 9-10 may be performed at or by the communication device 1100, or components thereof. The communication device 1100 includes a processor 1110, such as a digital signal processor (DSP), coupled to a memory 1132.

The memory 1132 may be a non-transitory tangible computer-readable and/or processor-readable storage device that stores instructions 1160. The instructions 1160 may be executable by the processor 1110 to perform one or more functions or methods described herein, such as the methods described with reference to FIGS. 7 and 9-10. The memory 1132 may also store one or more WLAN credentials 1190 (e.g., the WLAN credential(s) 105 of FIG. 1), a default credential 1192 (e.g., the stored default security credential 122 of FIG. 1), and/or an application layer credential 1194 (e.g., the application layer credential 124 of FIG. 1).

FIG. 11 shows that the communication device 1100 may also include a display controller 1126 that is coupled to the processor 1110 and to a display device 1128. A coder/decoder (CODEC) 1134 can also be coupled to the processor 1110. A speaker 1136 and a microphone 1138 can be coupled to the CODEC 1134. FIG. 11 also indicates that a wireless controller 1140 may be coupled to the processor 1110, where the wireless controller 1140 is in communication with an antenna 1142 via a transceiver 1150. The wireless controller 1140, the transceiver 1150, and the antenna 1142 may thus represent a wireless interface that enables wireless communication by the communication device 1100. For example, when the communication device 1100 is the mobile device 110 of FIG. 1, such a wireless interface may be used to communicate with the headless device 120 or the AP 130, as shown. The communication device 1100 may include numerous wireless interfaces, where different wireless networks are configured to support different networking technologies or combinations of networking technologies.

In a particular embodiment, the processor 1110, the display controller 1126, the memory 1132, the CODEC 1134, the wireless controller 1140, and the transceiver 1150 are included in a system-in-package or system-on-chip device 1122. In a particular embodiment, an input device 1130 and a power supply 1144 are coupled to the system-on-chip device 1122. Moreover, in a particular embodiment, as illustrated in FIG. 11, the display device 1128, the input device 1130, the speaker 1136, the microphone 1138, the antenna 1142, and the power supply 1144 are external to the system-on-chip device 1122. However, each of the display device 1128, the input device 1130, the speaker 1136, the microphone 1138, the antenna 1142, and the power supply 1144 can be coupled to a component of the system-on-chip device 1122, such as an interface or a controller.

One or more components of the communication device 1100, or components analogous thereto, may also be integrated into a headless device, such as the headless device 120 of FIG. 1, the enrollee 220 of FIGS. 2-6, or any combination thereof. For example, the headless device 120 of FIG. 1 and the enrollee 220 of FIGS. 2-6 may include a wireless controller, a transceiver, an antenna, a processor, and a memory storing instructions executable by the processor to perform the method of FIG. 8.

In conjunction with the described embodiments, an apparatus may include means for establishing, using an EAP exchange, a secure channel to a second apparatus while the apparatus is connected to a WLAN and the second apparatus is unconnected to the WLAN. For example, the means for establishing may include one or more components (e.g., a processor) of the mobile device 110 of FIG. 1, one or more components (e.g., a processor) of the mobile device 210 of FIGS. 2-6, the processor 1110, the wireless controller 1140, the transceiver 1150, the antenna 1142 of FIG. 11, one or more other devices configured to establish a secure channel, or any combination thereof. The first apparatus may also include means for sending, to the second apparatus via the secure channel, at least one credential associated with the WLAN to enable the second apparatus to connect to the WLAN. For example, the means for sending may include one or more components (e.g., a transmitter) of the mobile device 110 of FIG. 1, one or more components (e.g., a transmitter) of the mobile device 210 of FIGS. 2-6, the wireless controller 1140, the transceiver 1150, the antenna 1142 of FIG. 11, one or more other devices configured to send data, or any combination thereof.

In a particular embodiment, the first apparatus also includes means for receiving input indicating a security credential. For example, the means for receiving may include one or more components (e.g., a receiver) of the mobile device 110 of FIG. 1, one or more components (e.g., a receiver) of the mobile device 210 of FIGS. 2-6, the wireless controller 1140, the transceiver 1150, the antenna 1142 of FIG. 11, one or more other devices configured to receive data, or any combination thereof.

Another apparatus may include means for establishing a secure channel to a second apparatus while the apparatus is unconnected to a WLAN and the second apparatus is connected to the WLAN. For example, the means for establishing may include one or more components (e.g., a processor) of the headless device 120 of FIG. 1, one or more components (e.g., a processor) of the enrollee 220 of FIGS. 2-6, a wireless controller, a transceiver, an antenna, one or more other devices configured to establish a secure channel, or any combination thereof. The apparatus may also include means for receiving at least one credential associated with the WLAN from the second apparatus via the secure channel. The means for establishing is configured to use the at least one credential to establish a connection to the WLAN. For example, the means for receiving may include one or more components (e.g., a receiver) of the headless device 120 of FIG. 1, one or more components (e.g., a receiver) of the enrollee 220 of FIGS. 2-6, a wireless controller, a transceiver, an antenna, one or more other devices configured to receive data, or any combination thereof.

In a particular embodiment, the apparatus includes means for storing a security credential. For example, the means for storing may include one or more components (e.g., a memory) of the headless device 120 of FIG. 1, one or more components (e.g., a memory) of the enrollee 220 of FIGS. 2-6, one or more other devices configured to store data, or any combination thereof.

Another apparatus may include means for generating a first message and a second message. For example, the means for generating may include one or more components (e.g., a processor) of the mobile device 110 of FIG. 1, one or more components (e.g., a processor) of the mobile device 210 of FIGS. 2-6, the processor 1110 of FIG. 11, one or more other devices configured to generate messages, or any combination thereof. The apparatus may also include means for sending, where the means for sending is configured to send at least a first message to a second device during a WPS discovery operation and to send a second message to the second device during a WPS authentication and configuration operation that follows the WPS discovery operation. The second message may include data associated with an EAP using only a EAP-pwd exchange. For example, the means for sending may include one or more components (e.g., a transmitter) of the mobile device 110 of FIG. 1, one or more components (e.g., a transmitter) of the mobile device 210 of FIGS. 2-6, the wireless controller 1140, the transceiver 1150, the antenna 1142 of FIG. 11, one or more other devices configured to send data, or any combination thereof.

Another apparatus may include means for establishing a secure channel, while the apparatus is connected to a wireless local area network (WLAN) and a second apparatus is unconnected to the WLAN. For example, the means for establishing the secure channel may include one or more components (e.g., a processor) of the mobile device 110 of FIG. 1, one or more components (e.g., a processor) of the mobile device 210 of FIGS. 2-6, the processor 1110, the wireless controller 1140, the transceiver 1150, the antenna 1142 of FIG. 11, one or more other devices configured to establish a secure channel, or any combination thereof. The apparatus may also include means for sending, to the second apparatus via the secure channel, at least one credential associated with the WLAN to enable the second device to connect to the WLAN. For example, the means for sending may include one or more components (e.g., a transmitter) of the mobile device 110 of FIG. 1, one or more components (e.g., a transmitter) of the mobile device 210 of FIGS. 2-6, the wireless controller 1140, the transceiver 1150, the antenna 1142 of FIG. 11, one or more other devices configured to send data, or any combination thereof.

One or more of the disclosed embodiments may be implemented in a system or an apparatus that may include a communications device, a fixed location data unit, a mobile location data unit, a mobile phone, a cellular phone, a computer, a tablet, a portable computer, or a desktop computer. Additionally, the system or the apparatus may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although one or more of FIGS. 1-11 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including memory, a processor, and on-chip circuitry.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed or that the first element must precede the second element in some manner. Also, unless stated otherwise a set of elements may comprise one or more elements.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative components, blocks, configurations, modules, circuits, and steps have been described above generally in terms of their functionality. Whether such functionality is implemented as hardware or processor executable instructions depends upon the particular application and design constraints imposed on the overall system. Additionally, the various operations of methods described above may be performed by any suitable means capable of performing the operations, such as various hardware and/or software component(s), circuits, and/or module(s). Generally, any operations illustrated in the FIGS. 1-11 may be performed by corresponding functional means capable of performing the operations. Skilled artisans may implement the described functionality in varying ways for each particular application, but such implementation decisions should not be interpreted as causing a departure from the scope of the present disclosure.

Those of skill in the art would further appreciate that the various illustrative logical blocks, configurations, modules, circuits, and algorithm steps described in connection with the present disclosure may be implemented or performed with a general purpose processor, a digital signal processor (DSP), an application specific integrated circuit (ASIC), a field programmable gate array (FPGA), a programmable logic device (PLD), discrete gate or transistor logic, discrete hardware components (e.g., electronic hardware), computer software executed by a processor, or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored as one or more instructions or code on a computer-readable medium. Computer-readable media includes computer-readable storage media and communication media including any medium that facilitates transfer of a computer program data from one place to another. A storage media may be any available media that can be accessed by a computer. By way of example, and not limitation, such computer-readable storage media can include random access memory (RAM), read-only memory (ROM), programmable read-only memory (PROM), erasable PROM (EPROM), electrically erasable PROM (EEPROM), register(s), hard disk, a removable disk, a compact disc read-only memory (CD-ROM), other optical disk storage, magnetic disk storage, magnetic storage devices, or any other medium that can be used to store desired program code in the form of instructions or data structures and that can be accessed by a computer. In the alternative, the computer-readable media (e.g., a storage medium) may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), and floppy disk where disks usually reproduce data magnetically, while discs reproduce data optically with lasers. Thus, in some aspects computer readable medium may include a non-transitory computer readable medium (e.g., tangible media). In addition, in some aspects computer readable medium may include a transitory computer readable medium (e.g., a signal). Combinations of the above should also be included within the scope of computer-readable media.

The methods disclosed herein include one or more steps or actions. The method steps and/or actions may be interchanged with one another without departing from the scope of the claims. In other words, unless a specific order of steps or actions is specified, the order and/or use of specific steps and/or actions may be modified without departing from the scope of the disclosure.

Thus, certain aspects may include a computer program product for performing the operations presented herein. For example, a computer program product may include a computer-readable storage medium having instructions stored (and/or encoded) thereon, the instructions being executable by one or more processors to perform the operations described herein. The computer program product may include packaging material.

Further, it should be appreciated that modules and/or other appropriate means for performing the methods and techniques described herein can be downloaded and/or otherwise obtained by a user terminal and/or base station as applicable. Alternatively, various methods described herein can be provided via storage means (e.g., RAM, ROM, or a physical storage medium such as a compact disc (CD)). Moreover, any other suitable technique for providing the methods and techniques described herein can be utilized. It is to be understood that the scope of the disclosure is not limited to the precise configuration and components illustrated above.

The previous description of the disclosed embodiments is provided to enable a person skilled in the art to make or use the disclosed embodiments. While the foregoing is directed to aspects of the present disclosure, other aspects of the disclosure may be devised without departing from the basic scope thereof, and the scope is determined by the claims that follow. Various modifications, changes and variations may be made in the arrangement, operation, and details of the embodiments described herein without departing from the scope of the disclosure or the claims. Thus, the present disclosure is not intended to be limited to the embodiments herein but is to be accorded the widest scope possible consistent with the principles and novel features as defined by the following claims and equivalents thereof.

What is claimed is:

1. A method comprising:
    at a first device, while the first device is connected to a wireless local area network (WLAN) and a second device is unconnected to the WLAN, establishing a secure channel to the second device using an extensible authentication protocol (EAP) exchange;
    sending, to the second device via the secure channel, at least one credential associated with the WLAN to enable the second device to connect to the WLAN;
    receiving, at the first device, at least one application layer credential supplied by a user via user input; and
    sending, to the second device via the secure channel, the at least one application layer credential supplied by the user to enable the second device to access a network external to the WLAN.

2. The method of claim 1, wherein the first device comprises a mobile telephone, a portable computing device, a tablet computing device, a personal digital assistant (PDA), a portable media player, or any combination thereof.

3. The method of claim 1, wherein the second device comprises a smart energy profile (SEP)-compatible device.

4. The method of claim 1, wherein the second device comprises a headless device that includes at least one network interface but does not include an input device or an output device.

5. The method of claim 1, wherein the at least one credential comprises a service set identifier (SSID), a passphrase, a security key, or any combination thereof.

6. The method of claim 1, further comprising:
    receiving input at the first device indicating a security credential associated with the second device; and
    sending the security credential from the first device to the second device during the EAP exchange.

7. The method of claim 1, wherein the second device comprises a headless device and the application layer credential enables operations at the headless device that are layer-7 or lower.

8. The method of claim 1, wherein the first device comprises an autonomous Wi-Fi Direct group owner with respect to the second device.

9. The method of claim 8, further comprising maintaining compatibility with legacy Wi-Fi direct clients by refraining from issuing a notice of absence while communicating with the second device.

10. The method of claim 1, further comprising, at the first device, discovering the second device via a Wi-Fi Protected Setup (WPS) discovery operation.

11. The method of claim 1, further comprising:
    performing a four-way handshake operation after the EAP exchange; and
    performing a Wi-Fi Protected Setup (WPS) authentication and configuration operation using a null personal identification number (PIN).

12. The method of claim 1, wherein the EAP exchange comprises an EAP using only a password (EAP-pwd) exchange, and further comprising:
    determining a personal identification number (PIN) based on a portion of a master session key (MSK) associated with the EAP exchange; and
    performing a Wi-Fi Protected Setup (WPS) authentication and configuration operation using the PIN.

13. The method of claim 12, wherein the portion of the MSK comprises ten least significant bytes of the MSK.

14. The method of claim 1, wherein the EAP exchange comprises an EAP with encrypted key exchange (EAP-eke).

15. The method of claim 1, wherein the EAP exchange is triggered by a Wi-Fi Protected Setup (WPS) failure.

16. The method of claim 1, further comprising, at the first device, broadcasting a service set identification (SSID) associated with the second device, a device identifier associated with the second device, or a combination thereof to discover the second device.

17. The method of claim 1, wherein the at least one application layer credential corresponds to login information associated with a user account at a website.

18. A method comprising:
    receiving, at a first device, while the first device is unconnected to a wireless local area network (WLAN) and a second device is connected to the WLAN, a security credential;
    determining, at the first device during an extensible authentication protocol (EAP) exchange while the first device is unconnected to the WLAN and the second device is connected to the WLAN, whether the security credential matches a stored security credential stored in the first device;
    at the first device, while the first device is unconnected to the WLAN and the second device is connected to the WLAN, establishing a secure channel to the second device using the EAP exchange;
    receiving, at the first device from the second device via the secure channel, at least one credential associated with the WLAN;
    establishing, at the first device, a connection to the WLAN using the at least one credential;
    receiving, at the first device from the second device, at least one application layer credential, wherein the at least one application layer credential enables the first device to access a network external to the WLAN; and
    replacing the stored security credential with at least a portion of the at least one application layer credential.

19. The method of claim 18, further comprising terminating the EAP exchange when the received security credential does not match the stored security credential.

20. The method of claim 18, wherein the stored security credential is a layer-2 credential and the at least one application layer credential is a layer-7 credential.

21. The method of claim 18, further comprising accessing, via the WLAN, the network external to the WLAN using the at least one application layer credential.

22. A method comprising:
    at a first device, sending a first message to a second device during a Wi-Fi Protected Setup (WPS) discovery operation; and at the first device, sending a second message to the second device during a WPS authentication and configuration operation that follows the WPS discovery operation,
wherein the second message includes data associated with an extensible authentication protocol (EAP) using a password (EAP-pwd) exchange, and
wherein the data includes at least one link layer credential to enable the second device to access a wireless local area network (WLAN) and at least one application layer credential supplied by a user via user input to enable the second device to access a network external to the WLAN.

23. A method comprising:
at a first device, while the first device is connected to a wireless local area network (WLAN) and a second device is unconnected to the WLAN, establishing a secure channel to the second device using a Wi-Fi Protected Access 2 Pre-shared Key (WPA2-PSK) exchange;
receiving, at the first device, at least one application layer credential supplied by a user via user input;
sending, to the second device via the secure channel, at least one credential associated with the WLAN to enable the second device to connect to the WLAN; and
sending, to the second device via the secure channel, the at least one application layer credential supplied by the user to enable the second device to access a network external to the WLAN.

24. The method of claim 23, further comprising:
determining a personal identification number (PIN) based on a portion of a pairwise master key (PMK) associated with the WPA2-PSK exchange; and
performing a Wi-Fi Protected Setup (WPS) authentication and configuration operation using the PIN.

25. The method of claim 24, wherein the portion of the PMK comprises ten least significant bytes of the PMK.

26. The method of claim 23, further comprising discovering the second device via a Wi-Fi Direct discovery operation.

27. An apparatus comprising:
a processor; and
a memory coupled to the processor, the memory storing instructions executable by the processor to:
  establish, while the apparatus is connected to a wireless local area network (WLAN) and a second apparatus is unconnected to the WLAN, a secure channel to the second apparatus using an extensible authentication protocol (EAP) exchange;
  direct a transmitter to send, to the second apparatus via the secure channel, at least one credential associated with the WLAN to enable the second apparatus to connect to the WLAN; and
  direct the transmitter to send, to the second apparatus via the secure channel, at least one application layer credential supplied by a user via user input to enable the second apparatus to access a network external to the WLAN.

28. An apparatus comprising:
a processor; and
a memory coupled to the processor, the memory storing instructions executable by the processor to:
  determine, during an extensible authentication protocol (EAP) exchange while the apparatus is unconnected to a wireless local area network (WLAN) and a second apparatus is connected to the WLAN, whether a security credential received from the second apparatus matches a stored security credential stored in the apparatus;
  establish, while the apparatus is unconnected to the WLAN and the second apparatus is connected to the WLAN, a secure channel to the second apparatus using the EAP exchange;
  receive, from the second apparatus via the secure channel, at least one credential associated with the WLAN;
  establish a connection to the WLAN using the at least one credential;
  receive, from the second apparatus, at least one application layer credential, wherein the at least one application layer credential enables the apparatus to access a network external to the WLAN; and
  replace the stored security credential with at least a portion of the at least one application layer credential.

29. An apparatus comprising:
a processor; and
a memory coupled to the processor, the memory storing instructions executable by the processor to:
  direct a transmitter to send a first message to a second apparatus during a Wi-Fi Protected Setup (WPS) discovery operation; and
  direct the transmitter to send a second message to the second apparatus during a WPS authentication and configuration operation that follows the WPS discovery operation,
  wherein the second message includes data associated with an extensible authentication protocol (EAP) using a password (EAP-pwd) exchange, and
  wherein the data includes at least one link layer credential to enable the second apparatus to access a wireless local area network (WLAN) and at least one application layer credential supplied by a user via user input to enable the second apparatus to access a network external to the WLAN.

30. An apparatus comprising:
a processor; and
a memory coupled to the processor, the memory storing instructions executable by the processor to:
  establish, while the apparatus is connected to a wireless local area network (WLAN) and a second apparatus is unconnected to the WLAN, a secure channel to the second apparatus using a Wi-Fi Protected Access 2 Pre-shared Key (WPA2-PSK) exchange;
  direct a transmitter to send, to the second apparatus via the secure channel, at least one credential associated with the WLAN to enable the second apparatus to connect to the WLAN; and
  direct the transmitter to send, to the second apparatus via the secure channel, at least one application layer credential supplied by a user via user input to enable the second apparatus to access a network external to the WLAN.

31. An apparatus comprising:
means for establishing, while the apparatus is connected to a wireless local area network (WLAN) and a second apparatus is unconnected to the WLAN, a secure channel to the second apparatus using an extensible authentication protocol (EAP) exchange; and
means for sending, to the second apparatus via the secure channel, at least one credential associated with the WLAN to enable the second apparatus to connect to the WLAN, wherein the means for sending is configured to send, to the second apparatus via the secure channel, at least one application layer credential supplied by a user via user input to enable the second apparatus to access a network external to the WLAN.

32. An apparatus comprising:
means for determining, during an extensible authentication protocol (EAP) exchange while the apparatus is unconnected to a wireless local area network (WLAN) and a second apparatus is connected to the WLAN, whether a security credential received from the second apparatus matches a stored security credential stored in the apparatus;
means for establishing, while the apparatus is unconnected to the WLAN and the second apparatus is connected to the WLAN, a secure channel to the second apparatus using the extensible authentication protocol (EAP) exchange;
means for receiving, from the second apparatus via the secure channel, at least one credential associated with the WLAN, wherein the means for establishing establishes a connection to the WLAN using the at least one credential, and wherein the means for receiving is configured to receive, from the second apparatus, at least one application layer credential, wherein the at least one application layer credential enables the apparatus to access a network external to the WLAN; and
means for replacing the stored security credential with at least a portion of the at least one application layer credential.

33. An apparatus comprising:
means for generating a first message and a second message; and
means for sending, wherein the means for sending is configured to:
send the first message to a second apparatus during a Wi-Fi Protected Setup (WPS) discovery operation; and
send the second message to the second apparatus during a WPS authentication and configuration operation that follows the WPS discovery operation,
wherein the second message includes data associated with an extensible authentication protocol (EAP) using a password (EAP-pwd) exchange, and
wherein the data includes at least one link layer credential to enable the second apparatus to access a wireless local area network (WLAN) and at least one application layer credential supplied by a user via user input to enable the second apparatus to access a network external to the WLAN.

34. An apparatus comprising:
means for establishing, while the apparatus is connected to a wireless local area network (WLAN) and a second apparatus is unconnected to the WLAN, a secure channel to the second apparatus using a Wi-Fi Protected Access 2 Pre-shared Key (WPA2-PSK) exchange; and
means for sending, to the second apparatus via the secure channel, at least one credential associated with the WLAN to enable the second apparatus to connect to the WLAN, wherein the means for sending is configured to send, to the second apparatus via the secure channel, at least one application layer credential supplied by a user via user input to enable the second apparatus to access a network external to the WLAN.

35. A non-transitory computer-readable medium comprising instructions that when executed cause an apparatus to:
establish, while the apparatus is connected to a wireless local area network (WLAN) and a second apparatus is unconnected to the WLAN, a secure channel to the second apparatus using an extensible authentication protocol (EAP) exchange;
send, to the second apparatus via the secure channel, at least one credential associated with the WLAN to enable the second apparatus to connect to the WLAN; and
send, to the second apparatus via the secure channel, at least one application layer credential supplied by a user via user input to enable the second apparatus to access a network external to the WLAN.

36. A non-transitory computer-readable medium comprising instructions that when executed cause an apparatus to:
determine, during an extensible authentication protocol (EAP) exchange while the apparatus is unconnected to a wireless local area network (WLAN) and a second apparatus is connected to the WLAN, whether a security credential received from the second apparatus matches a stored security credential stored in the apparatus;
establish, while the apparatus is unconnected to the WLAN and the second apparatus is connected to the WLAN, a secure channel to the second apparatus using the EAP exchange;
receive, from the second apparatus via the secure channel, at least one credential associated with the WLAN;
establish a connection to the WLAN using the at least one credential;
receive, from the second apparatus, at least one application layer credential, wherein the at least one application layer credential enables the apparatus to access a network external to the WLAN; and
replace the stored security credential with at least a portion of the at least one application layer credential.

37. A non-transitory computer-readable medium comprising instructions that when executed cause an apparatus to:
send a first message to a second apparatus during a Wi-Fi Protected Setup (WPS) discovery operation; and
send a second message to the second apparatus during a WPS authentication and configuration operation that follows the WPS discovery operation,
wherein the second message includes data associated with an extensible authentication protocol (EAP) using a password (EAP-pwd) exchange, and
wherein the data includes at least one link layer credential to enable the second apparatus to access a wireless local area network (WLAN) and at least one application layer credential supplied by a user via a user input to enable the second apparatus to access a network external to the WLAN.

38. A non-transitory computer-readable medium comprising instructions that when executed cause an apparatus to:
establish, while the apparatus is connected to a wireless local area network (WLAN) and a second apparatus is unconnected to the WLAN, a secure channel to the second apparatus using a Wi-Fi Protected Access 2 Pre-shared Key (WPA2-PSK) exchange;
send, to the second apparatus via the secure channel, at least one credential associated with the WLAN to enable the second apparatus to connect to the WLAN; and
send, to the second apparatus via the secure channel, at least one application layer credential supplied by a user via user input to enable the second apparatus to access a network external to the WLAN.

* * * * *